United States Patent [19]

Sundet

[11] Patent Number: 5,631,057

[45] Date of Patent: May 20, 1997

[54] SIMULATED BEVELED GLASS APPLIQUE

[75] Inventor: Douglas C. Sundet, North Hudson, Wis.

[73] Assignee: Minnesota Mining and Manufacturing Company, St. Paul, Minn.

[21] Appl. No.: 435,584

[22] Filed: May 5, 1995

[51] Int. Cl.$^6$ .............................. B32B 3/02; B44F 1/04; E04C 1/42

[52] U.S. Cl. .............................. 428/60; 428/79

[58] Field of Search .............................. 428/60, 13, 79; 52/204.59, 311.1

[56] References Cited

U.S. PATENT DOCUMENTS

| | | | |
|---|---|---|---|
| 1,345,792 | 7/1920 | McAvoy | 428/14 X |
| 2,162,590 | 6/1939 | Richter et al. | 428/49 X |
| 3,420,730 | 1/1969 | Ellefson | 428/38 |
| 3,438,838 | 4/1969 | Pellicer et al. | 428/67 X |
| 3,908,056 | 9/1975 | Anderson | 428/142 |
| 4,068,441 | 1/1978 | Shaffer | 52/308 |
| 4,127,689 | 11/1978 | Holt | 428/38 |
| 4,129,671 | 12/1978 | Greenberg | 428/48 |
| 4,154,880 | 5/1979 | Drennan | 428/38 |
| 4,192,905 | 3/1980 | Scheibal | 428/80 |
| 4,256,159 | 3/1981 | Williams | 428/79 X |
| 4,312,688 | 1/1982 | Brodis et al. | 156/63 |
| 4,318,946 | 3/1982 | Pavone | 428/34 |
| 4,386,123 | 5/1983 | Coburn, Jr. | 428/60 X |
| 4,438,165 | 3/1984 | Butler | 428/38 |
| 4,488,919 | 12/1984 | Butler | 428/38 X |
| 4,495,739 | 1/1985 | Drennan | 52/308 |
| 4,619,850 | 10/1986 | Charlton | 428/38 |
| 4,748,062 | 5/1988 | Menjo et al. | 428/46 |
| 4,814,213 | 3/1989 | Thorn | 428/34 |
| 4,842,904 | 6/1989 | Swarovski | 428/28 |
| 4,904,513 | 2/1990 | DeNicolo | 428/46 |
| 4,933,218 | 6/1990 | Longobardi | 428/38 |
| 4,997,687 | 3/1991 | Carter | 428/34 |
| 5,013,592 | 5/1991 | Culpepper | 428/60 X |
| 5,098,760 | 3/1992 | Fletcher | 428/38 X |
| 5,227,220 | 7/1993 | Biedermann | 428/172 |
| 5,260,114 | 11/1993 | Smith, Jr. | 428/161 |

FOREIGN PATENT DOCUMENTS 3-256735  11/1991  Japan .

OTHER PUBLICATIONS

Warner–Crivellaro Stained Glass, Inc. Supply Catalog, from Warner–Crivellaro Stained Glass Supplies, Inc., 1855 Weaversville Road, Allentown, PA 18103.

*Primary Examiner*—Henry F. Epstein
*Attorney, Agent, or Firm*—Gary L. Griswold; Walter N. Kirn; William L. Huebsch

[57] ABSTRACT

An appliqué adapted to be adhered for decorative purposes to a planar surface on a layer of transparent material (e.g., of glass or plastic). The appliqué comprises a layer of polymeric material which is transparent and free of visible inclusions. The front surface of that layer includes a planar central portion having a decorative surface texture (e.g., the surface texture of rippled glass, hammered glass, moss glass, Flemish glass, glue chip glass, or baroque glass), and beveled surface portions around that textured surface portion.

11 Claims, 2 Drawing Sheets

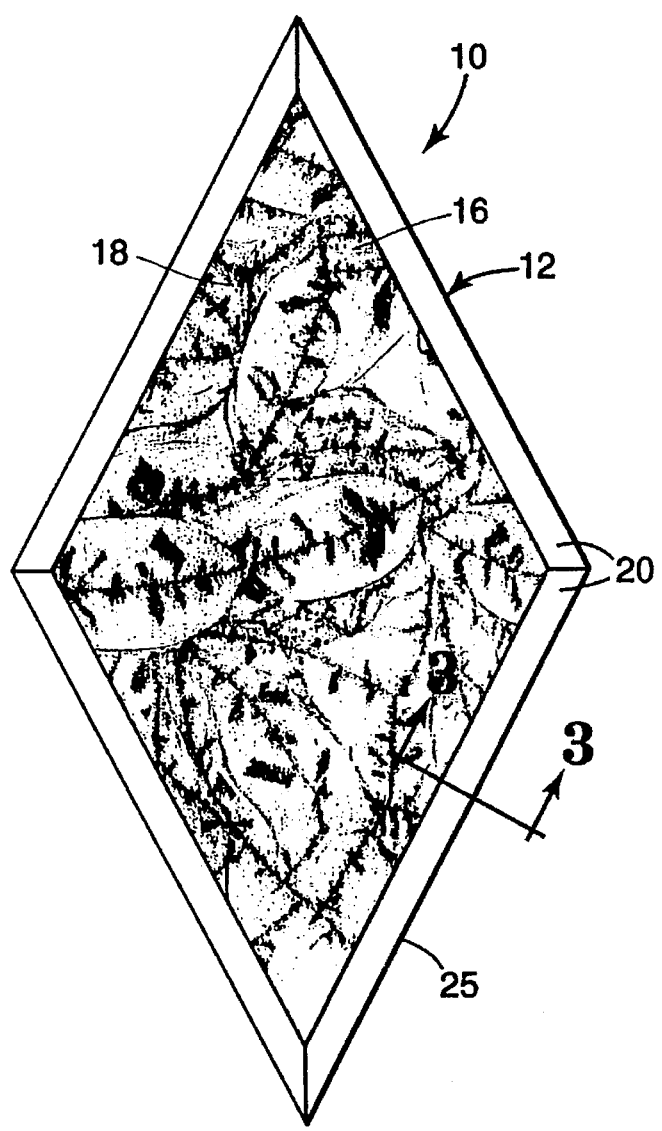 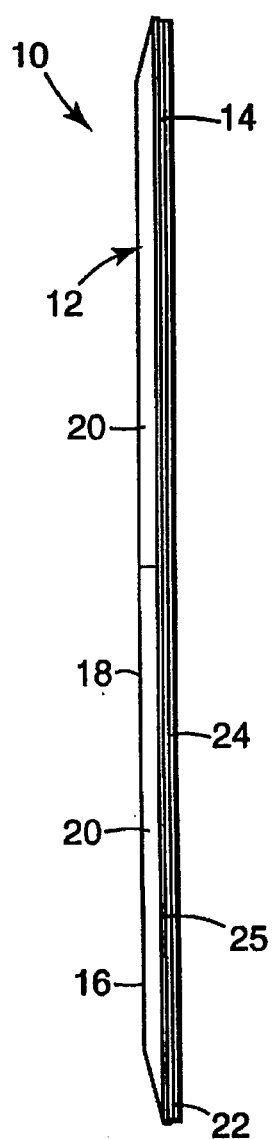
Fig. 1　　　Fig. 2
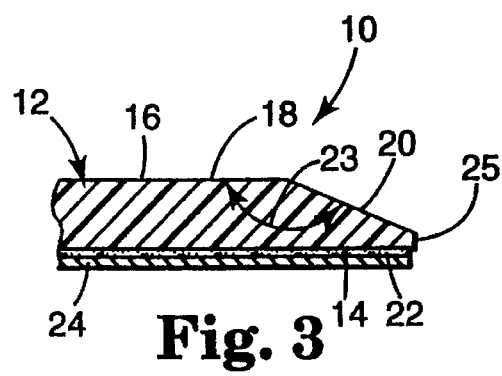
Fig. 3

SIMULATED BEVELED GLASS APPLIQUE

FIELD OF THE INVENTION

The present invention generally relates to appliqués adapted to be adhered to sheets of glass (e.g., in windows, mirrors, or the like) to provide a decorative appearance, and particularly to such appliqués that when applied have the appearance of pieces of cut beveled glass.

BACKGROUND OF THE INVENTION

It is well known to use cut glass pieces of various peripheral shapes that can have beveled edge portions and/or decorative surface textures for a variety of decorative purposes. Such cut glass pieces have been assembled into decorative panels with other such glass pieces or planar glass pieces using lead or brass came and used in windows, doors, mirrors or tables. The process required to form the surface texture on the glass pieces, cut the glass pieces to shape and assemble shapes using the lead came is expensive and requires considerable skill and time. Thus such panels are typically quite expensive.

U.S. Pat. Nos. 5,098,760 and 4,619,850 describe different approaches for forming panels that generally have the appearance of the type of decorative panels described above by adhering glass appliqueés to the surfaces of a glass panels, and thereby forming decorative glass panels at less expense than by the method described above, and allowing persons to form decorative glass panels from existing plane glass panels. These approaches, however, require forming glass appliqueés, and a person forming the panel must work with those glass appliqueés in a manner that, for some, may be difficult.

SUMMARY OF THE INVENTION

The present invention provides appliqueés that simulate the appearance of cut beveled glass pieces with decorative surface portions that may be adhered to the surface of transparent panels to thereby form decorative panels at less expense than by the methods described above, and that allow persons to form decorative panels from existing plane glass or polymeric panels in a simple manner that may easily be performed by most persons.

According to the present invention there is provided an appliqué adapted to be adhered for decorative purposes to a planar surface on a layer of transparent material, which appliqué comprises a layer of polymeric material. The layer of polymeric material is transparent and free of visible inclusions, and has a planar rear surface and an opposite front surface. The front surface includes a central portion generally parallel with its rear surface that has a decorative surface texture, and beveled surface portions around its textured surface portion extending from the textured surface portion toward its rear surface.

The textured surface on the appliqué can be any of the surface textures typically found on textured glass, which can include, but are not limited to, the surface textures found on what are called rippled glass, hammered glass, moss glass, Flemish glass, glue chip glass, and baroque glass.

The polymeric materials from which the appliqué can be made include plasticized polyvinyl chloride, polycarbonate, cellulose acetate butyrate, methylmethacrylate, and polystyrene.

While the appliqué can be adhered to the panel using liquid adhesives applied between the appliqué and the panel at the time of application, preferably, to insure that the adhesive by which it is applied is free of inclusions so that it will not be seen when the appliqué is applied, the appliqué can further include a layer of pressure sensitive adhesive along and entirely covering its rear surface.

So that it simulates a piece of cut glass, the layer of polymeric material in the appliqué should have a thickness between its front and rear surfaces of at least 0.023 inch, and preferably about 0.076 inch, and its beveled surface portions should be disposed at an angle in the range of about 140° to 178° degrees with respect to its textured surface portion.

BRIEF DESCRIPTION OF THE DRAWINGS

The present invention will be more fully described with reference to the accompanying drawing wherein like reference numerals refer to like parts in the several views, and wherein:

FIG. 1 is a front view of an appliqué according to the present invention;

FIG. 2 is a edge view of the appliqué of FIG. 1;

FIG. 3 is a sectional view taken approximately along line 3—3 of FIG. 1; and

DETAILED DESCRIPTION OF A PREFERRED EMBODIMENT

Figure 4:
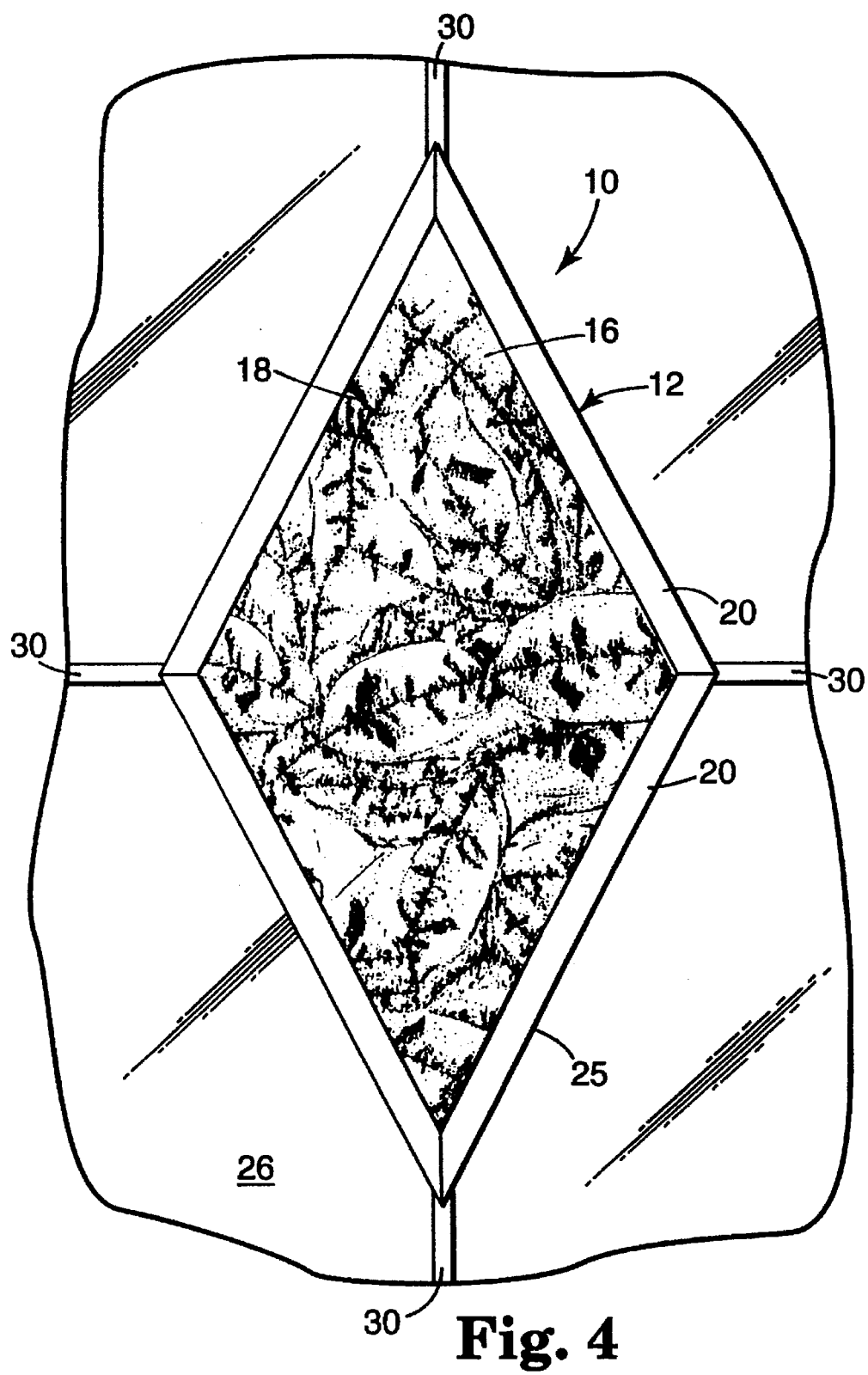
FIG. 4 is a fragmentary view of the appliqué of FIG. 1 and simulated came adhered to a panel to provide a decorative effect.

Referring now to the drawing, there is illustrated an appliqué according to the present invention generally designated by the reference numeral 10.

As is best seen in FIGS. 1 and 2, the appliqué 10 comprises a layer 12 of polymeric material that is transparent and free of visible inclusions. The layer 12 has a planar rear surface 14 and an opposite front surface 16. That front surface 16 includes a planar central portion 18 generally parallel with the rear surface 14 and having a decorative surface texture; and beveled surface portions 20 around that textured surface portion 18 extending from the textured surface portion 18 toward the rear surface 14.

As illustrated, the surface texture on the central portion 18 of the front surface 16 is the same as the surface texture on what is called glue chip glass. The surface texture on glue chip glass is formed by applying animal glue to the surface of glass that has been sandblasted, and then heating the glue and allowing it to dry, which causes the glue to pull chips from the surface of the glass, thereby producing a generally fern like surface pattern or texture.

Alternatively, however the texture on the central portion 18 could be any of the many surface textures typically found on textured glass. Such textures include the surface textures on what is called ripple glass, the surface of which has high and low spots of rippled or wormy contour or texture; hammered glass which has circular hammered impressions along its surface; moss glass which has a fine gravely surface contour or texture; Flemish glass which has wide high and low spots along its surface; and baroque glass which has a raised wildly swirled surface contour or texture.

So that it will have the appearance of cut beveled glass when applied to a sheet of glass, the layer 12 of polymeric material should be free of inclusions and optically clear, and should have an index of refraction between 1.35 and 1.65. Examples of suitable materials from which to produce the layer 12 of polymeric material include plasticized polyvinyl chloride, polycarbonate, cellulose acetate butyrate, methylmethacrylate, and polystyrene.

As illustrated, the appliqué 10 also includes a layer 22 of pressure sensitive adhesive along and entirely covering its rear surface 14. The layer 22 of pressure sensitive adhesive should be free of visible inclusions, and can be one of the acrylate type pressure sensitive adhesives commercially identified as SCW-100 transfer adhesive, Scotch brand 666 double coated tape and Scotch brand VHB transfer adhesive, all manufactured by Minnesota Mining and Manufacturing Company, St. Paul, Minn. UV curable acrylate pressure sensitive adhesives may also be useful. The side of the layer 22 of pressure sensitive adhesive opposite the rear surface 14 can be protected with a conventional release liner 24 which is removed just prior to adhering the appliqué 10 to a substrate or panel.

The appliqué 10 is illustrated with a diamond shaped periphery 25, however it can be made with a periphery of any shape that is desired (e.g., square, round, octagonal, rectangular, free form, etc.) to provide a decorative effect. So that the appliqué 10 will provide the appearance of a piece of cut glass, it should have a thickness between its rear surface 14 and the central textured surface portion 18 of its front surface 16 of at least 0.023 inch, and preferably a thickness of about 0.076 inch. The beveled surface portions 20 of the appliqué 10 should be disposed at an angle 23 in the range of about 140° to 178° degrees and preferably about 170° degrees with respect to the textured surface portion 18, and should have a width normal to the periphery 25 of the appliqué 10 in the range of about 0.25 to 0.5 inch.

The appliqué 10 can be applied to a transparent panel 26 of glass or polymeric material (see FIG. 4) by simply removing the release liner 24 and pressing the layer 22 of pressure sensitive adhesive against the cleaned surface of the panel 26. A method of applying the appliqué 10 which allows it to be repositionable on the surface of the panel 26 for a short period of time so that it can be precisely positioned is to first apply to the panel 26 a mixture of water, polypropyl alcohol and liquid detergent, such as a liquid dish washing detergent (e.g., "Joy" (trade mark) liquid detergent, manufactured by Procter & Gamble, Cincinnati, Ohio in an approximate ratio of 40:20:1. That liquid mixture allows the appliqué 10 to be easily slid around the surface of a glass panel until it is precisely in a desired location. The liquid will evaporate over time, such as overnight, after which the appliqué 10 will be permanently bonded to the glass. This method further reduces visual flaws, such as entrapped air, when the appliqué 10 is adhered to glass.

The appliqué 10 may be fabricated by one of several methods. One such method is to first form a piece of cut glass in a shape that is desired to be replicated and with the desired surface texture on the central portion of its front surface which is formed by traditional glass working methods. That piece of cut glass is first plated with electroless silver over its front surface to make that surface conductive, and then further coated with a heavy coating of nickel (e.g., 0.06 inch thick) by an electroplating process. The piece of cut glass is separated or broken away from the metal coating that then becomes a mold corresponding in shape to the surface of the cut glass piece and having a surface texture that is a mirror image of the surface texture of the cut glass piece. That mold can either be adapted for use as part of the mold in an injection molding process using liquid polymeric material, or can be used as a die that is pressed against a heated (e.g., about 370 degree Fahrenheit) solid layer of polymeric material (e.g., vinyl) and then cooled under pressure to replicate the front surface of the cut glass piece with polymeric material, after which the periphery of the polymeric material is cut to the appropriate shape. An alternative method for fabricating the appliqué is to photograph a surface texture that is desired on the central textured portion 18, machine a mold having the desired shape for the periphery and front surface of the appliqué, except for having a planar surface for the surface portion 18, using a photochemical engraving process to form the mirror image of the desired surface texture on the surface of the die corresponding to the textured surface portion 18 of the appliqué, and then using that mold either in an injection molding process using liquid polymeric material, or as a die into which solid layers of polymeric material are pressed under heat and pressure to form the appliqué 10.

FIG. 4 illustrates use of the appliqué 10 according to the present invention in combination with simulated came 30 on the panel 26 to simulate the appearance of a leaded window or a leaded mirror. The simulated came 30 can be one of the types of simulated brass or lead came described in my U.S. patent application No. 08/428,564 filed Apr. 25, 1995, attorney docket number 50861USA1A, (the content whereof is incorporated herein by reference), or can alternatively be one of the types of simulated came presently available in the marketplace, which simulated cames typically comprise a strip (e.g., of lead or brass or vapor coated polymeric material) that can be cut to length and adhered to the surface of the panel by a layer of pressure sensitive adhesive coated on the simulated cames.

The present invention has now been described with reference to one embodiment, and several possible modifications thereof. It will be apparent to those skilled in the art that many changes can be made in the embodiment described without departing from the scope of the present invention. Thus the scope of the present invention should not be limited to the structures described in this application, but only by the structure described by the language of the claims and the equivalents thereof.

I claim:

1. An appliqué adapted to be adhered for decorative purposes to a planar surface of a layer of transparent material, said appliqué comprising only one layer of rigid polymeric material, said layer of rigid polymeric material being transparent and free of visible inclusions, and having a planar rear surface and an opposite front surface, said front surface including a central portion generally parallel with said rear surface and having a decorative surface texture selected from a group of surface textures typically found on textured glass consisting of rippled texture, wormy texture, hammered texture, moss texture, Flemish texture, glue chip texture, and baroque texture, said front surface also including beveled surface portions around said textured surface portion starting at and extending from said textured surface portion toward said rear surface.

2. An appliqué according to claim 1, wherein said polymeric material has an index of refraction between 1.35 and 1.65 and is selected from a group consisting of plasticized polyvinyl chloride, polycarbonate, cellulose acetate butyrate, methylmethacrylate, and polystyrene.

3. An appliqué according to claim 1 further including a layer of pressure sensitive adhesive along and entirely covering said rear surface, said layer of pressure sensitive adhesive being free of visible inclusions.

4. An appliqué according to claim 1 wherein said layer of polymeric material has a thickness between said front and rear surfaces of at least 0.023 inch.

5. An appliqué according to claim 1 wherein said layer of polymeric material has a thickness between said front and rear surfaces of about 0.076 inch, and said beveled surface portions are disposed at an angle of about 170° degrees with respect to said textured surface portion.

6. In combination, a sheet of transparent material having first and second major surfaces; and an appliqué comprising only one layer of rigid polymeric material, said layer of rigid polymeric material being transparent and free of visible inclusions, and having a planar rear surface and an opposite front surface, said front surface including a central portion generally parallel to said rear surface and having a decorative surface texture selected from a group of surface textures typically found on textured glass consisting of rippled texture, wormy texture, hammered texture, moss texture, Flemish texture, glue chip texture, and baroque texture, said front surface also including beveled surface portions around said textured surface portion starting at and extending from said textured surface portion toward said rear surface; and a layer of pressure sensitive adhesive adhering said rear surface of said appliqué to said first surface of said layer of transparent material, said layer of adhesive being along and entirely covering said rear surface and being free of visible inclusions.

7. A combination according to claim 6 wherein said sheet is of glass.

8. A combination according to claim 7 wherein said sheet is has a coating of reflective material over said second surface.

9. A combination according to claim 6 wherein said sheet is a portion of a window.

10. A combination according to claim 6 wherein said sheet is of polymeric material.

11. A combination according to claim 6, wherein said polymeric material is selected from a group consisting of plasticized polyvinyl chloride, polycarbonate, cellulose acetate butyrate, methylmethacrylate, and polystyrene.

* * * * *